United States Patent
Huber et al.

(10) Patent No.: US 10,563,065 B2
(45) Date of Patent: Feb. 18, 2020

(54) PEARLESCENT PIGMENTS OBTAINED BY WET OXIDATION

(71) Applicant: Schlenk Metallic Pigments GmbH, Roth (DE)

(72) Inventors: Adalbert Huber, Bensheim (DE); Kaiman Shimizu, Roth (DE)

(73) Assignee: SCHLENK METALLIC PIGMENTS GMBH (DE)

( * ) Notice: Subject to any disclaimer, the term of this patent is extended or adjusted under 35 U.S.C. 154(b) by 10 days.

(21) Appl. No.: 15/866,680

(22) Filed: Jan. 10, 2018

(65) Prior Publication Data
US 2018/0194946 A1 Jul. 12, 2018

(30) Foreign Application Priority Data
Jan. 10, 2017 (EP) .................... 17000036

(51) Int. Cl.
| C09C 1/00 | (2006.01) |
| C09C 1/64 | (2006.01) |
| C09C 3/04 | (2006.01) |
| C09C 3/06 | (2006.01) |
| C09D 5/36 | (2006.01) |
| C08K 9/02 | (2006.01) |

(52) U.S. Cl.
CPC ............. *C09C 1/0051* (2013.01); *C08K 9/02* (2013.01); *C09C 1/00* (2013.01); *C09C 1/64* (2013.01); *C09C 1/642* (2013.01); *C09C 3/043* (2013.01); *C09C 3/063* (2013.01); *C09D 5/36* (2013.01); *C01P 2004/54* (2013.01); *C01P 2004/61* (2013.01); *C01P 2006/62* (2013.01); *C01P 2006/63* (2013.01); *C01P 2006/64* (2013.01); *C01P 2006/65* (2013.01); *C09C 2200/1004* (2013.01); *C09C 2200/105* (2013.01); *C09C 2200/1037* (2013.01); *C09C 2200/1054* (2013.01); *C09C 2200/1058* (2013.01); *C09C 2200/20* (2013.01); *C09C 2200/301* (2013.01); *C09C 2200/302* (2013.01); *C09C 2200/303* (2013.01); *C09C 2200/401* (2013.01); *C09C 2220/106* (2013.01)

(58) Field of Classification Search
CPC ......... C09C 1/0051; C09C 1/64; C09C 1/642; C09C 3/043; C09C 2200/1004; C09C 2200/1058; C09C 2200/1054; C09C 2200/1037; C09C 2200/302; C09C 2200/303; C09C 2200/401; C09C 2220/106; C09D 5/36; C01P 2004/54; C01P 2004/61; C01P 2004/64; C01P 2006/62; C01P 2006/63; C01P 2006/64; C01P 2006/65

See application file for complete search history.

(56) References Cited

U.S. PATENT DOCUMENTS

| 4,328,042 A | 5/1982 | Ostertag et al. |
| 4,542,182 A | 9/1985 | Schuppiser |
| 5,277,711 A | 1/1994 | Schmidt |
| 5,607,504 A | 3/1997 | Schmid |
| 5,624,486 A | 4/1997 | Schmid |
| 5,964,936 A * | 10/1999 | Reisser ..................... C09C 1/64 106/404 |
| 5,972,098 A | 10/1999 | Andes |
| 6,398,999 B1 | 6/2002 | Josephy |
| 6,432,535 B1 | 8/2002 | Noguchi |
| 6,599,355 B1 | 7/2003 | Schmidt et al. |
| 6,776,835 B2 | 8/2004 | Andes et al. |
| 7,452,597 B2 | 11/2008 | Bujard |
| 7,828,890 B2 | 11/2010 | Henglein |
| 7,943,194 B2 | 5/2011 | Bujard |
| 8,647,429 B2 | 2/2014 | Melson |
| 8,846,783 B2 | 9/2014 | Rathschlag |
| 2002/0160194 A1 * | 10/2002 | Phillips .................... B41M 3/14 428/403 |
| 2003/0005859 A1 | 1/2003 | Andes |
| 2003/0008120 A1 | 1/2003 | Andes |
| 2003/0209169 A1 | 11/2003 | Andes et al. |
| 2004/0244640 A1 | 12/2004 | Vogt et al. |
| 2005/0013934 A1 | 1/2005 | Xiong |
| 2005/0176850 A1 | 8/2005 | Schmidt |
| 2005/0223940 A1 | 10/2005 | Seeger et al. |
| 2005/0260352 A1 | 11/2005 | Maul |
| 2007/0104663 A1 | 5/2007 | Henglein et al. |
| 2007/0199478 A1 | 8/2007 | Eckart |
| 2007/0259182 A1 | 11/2007 | Bujard |
| 2010/0047199 A1 | 2/2010 | Eckart |
| 2012/0219607 A1 | 8/2012 | Schmidt |
| 2015/0098972 A1 | 4/2015 | Schumacher |
| 2016/0168387 A1 * | 6/2016 | Shimizu ............... A61K 8/0266 106/404 |

FOREIGN PATENT DOCUMENTS

| CN | 101445675 A | 6/2009 |
| EP | 0806457 A2 | 11/1997 |
| EP | 1072651 | 1/2001 |
| EP | 1072651 A1 | 1/2001 |
| EP | 1564261 | 8/2005 |
| EP | 1564261 A2 | 8/2005 |
| EP | 1621585 A2 | 2/2006 |
| EP | 1621586 A1 | 2/2006 |
| EP | 2799397 A2 | 11/2014 |
| JP | H0693206 | 4/1994 |
| JP | H08209024 | 8/1996 |
| JP | H09249442 | 9/1997 |
| JP | 2002522618 | 7/2002 |

(Continued)

*Primary Examiner* — Pegah Parvini
(74) *Attorney, Agent, or Firm* — McDonald Hopkins LLC (57) ABSTRACT

The present invention relates to pearlescent pigments, to a process of manufacturing such pearlescent pigments based on a wet oxidation step as well as to the use of such pearlescent pigments.

15 Claims, 2 Drawing Sheets

(56) References Cited

FOREIGN PATENT DOCUMENTS

| | | | |
|---|---|---|---|
| JP | 2002528639 | | 9/2002 |
| JP | 2006506518 | | 2/2006 |
| JP | 2008511704 | | 4/2008 |
| JP | 2013064053 | | 4/2013 |
| KR | 1020040047972 | | 6/2004 |
| KR | 1020050006248 | | 1/2005 |
| RU | 2404220 | C2 | 11/2010 |
| RU | 2434908 | C2 | 11/2011 |
| WO | 00/34395 | A1 | 6/2000 |
| WO | 2004055119 | A1 | 7/2004 |
| WO | 2004/113455 | A2 | 12/2004 |
| WO | 2005/049739 | A2 | 6/2005 |
| WO | WO2005/049739 | | 6/2005 |
| WO | 2006/021528 | A2 | 3/2006 |
| WO | 2006/066825 | A2 | 6/2006 |
| WO | 2006114171 | A1 | 11/2006 |
| WO | 2007053409 | A2 | 5/2007 |
| WO | 2009/083176 | A1 | 7/2009 |
| WO | 2011045030 | A1 | 4/2011 |
| WO | WO2011/045030 | | 4/2011 |
| WO | 2011095326 | A1 | 8/2011 |
| WO | WO2011/095326 | | 8/2011 |
| WO | 2013156327 | A1 | 10/2013 |
| WO | 2015014484 | A1 | 2/2015 |
| WO | WO 2015/014484 | * | 2/2015 ............... C09C 1/00 |

* cited by examiner

PEARLESCENT PIGMENTS OBTAINED BY WET OXIDATION

The present application claims priority to European Patent Application No. 17000036.8 filed Jan. 10, 2017, which is incorporated herein by reference in its entirety.

The present invention relates to pearlescent pigments, to a process of manufacturing such pearlescent pigments based on a wet oxidation step as well as to the use of such pearlescent pigments.

Luster pigments, in particular metallic luster pigments and metal effect pigments, respectively, find broad applications within many technical fields. For example, they are used for coloring of varnishes, printing inks, inks, plastics, glasses, ceramic products, and preparations for decorative cosmetics as well as security applications. The use of metallic luster pigments is of particular economic importance in automobile finishing. Due to their non-copyable optical effects, luster pigments are also used in the manufacturing of forgery-proof securities and documents such as cash notes, cheques, debit and credit cards as well as tickets. In particular, metallic luster pigments are characterized by their appealing angle-dependent color impression (goniochromism) and their seemingly metalloid luster.

As long as usual pigments are concerned, a color impression only results from absorption of certain wavelengths of the incident light and from scattered reflection. Commonly used metal effect pigments reflect the incident light to a considerable amount and generate a light-dark flop, without a color impression originating therefrom. In case of the special luster pigment type known as pearlescent pigments, a color impression, however, originates from optical interference effects. Pearlescent pigments which are usually based on plate-like substrates are at least coated once, and exhibit interference effects arising from the interference of differently refracted and reflected rays of light. Accordingly, pearlescent pigments are also referred to as interference pigments. White light which is incident on the even surface of the coated substrates is partially reflected at the outer surface of the coating. The other part is refracted and reflected at the boundary surface between the coating and the surface of the substrate, for example, and is then again refracted. This leads to an interference of rays of light having different phases, resulting in the generation of a color impression. Since the phase difference depends on the incident/observation angle, the color impression is also angle-dependent. This effect of color change between different reflection angles is known as a color flop. The phase difference is inter alia dependent on the thickness of the coating(s), which allows to adjust the emerging color impression on the basis of said coating thickness(es).

One of the longest well-known pearlescent pigments is natural fish silver. However, due to its complex recovery process and the high costs associated therewith, it only plays a minor role. Besides, there are lead-containing monocrystalline pearlescent pigments such as basic lead carbonate or lead hydrogen phosphate, but in the recent years, non-toxic pearlescent pigments have evoked intensified interest. In this context, pigments based on bismuth oxide chloride are to be mentioned, for example. They are characterized by both a high luster appearance and a good coverage property. However, bismuth oxide chloride only exhibits a small light stability and can only be provided in paste form. A further disadvantage thereof is the rather low mechanical stability.

Pearlescent pigments comprising interference layers formed on a substrate are most common. The interference layers consist of metal oxides such as titanium dioxide or iron oxide, for example. As a substrate, natural or synthetic mica, glass flakes, alumina flakes, silica flakes, or metallic flakes are frequently used.

Interference pigments based on transparent plate-like substrates such as mica, silicon dioxide or aluminum oxide, and coated with a high-refractive coating consisting of $TiO_2$, are described in EP 1 564 261 A2. The plate-like substrates have an average thickness in the range of from 0.02 to 2 µm, preferably in the range of from 0.1 to 1 µm, and particularly preferably in the range of from 0.2 to 0.8 µm. In order to achieve an intensive color effect with an angle-dependent color hue based on interference, the average thickness of the individual plate-like substrates has to be within a standard deviation of less than 15%.

WO 2011/095326 A1 describes effect pigments based on uncoated or coated plate-like substrates, which have a calcinated outer coating of metal oxides. Regarding the dimensions of the plate-like substrates, WO 2011/095326 A1 describes that normal-sized substrates can be used without specific requirements. Due to their outer coating, these effect pigments exhibit a high stability despite the absence of corresponding post-coatings.

EP 1 072 651 A1 describes pigments based on thin flakes, having an average particle size of from 0.5 to 10 µm, preferably from 2 to 8 µm, which are coated with spherical $SiO_2$ particles first, and subsequently coated with ultrafine $TiO_2$ particles. For example, such pigments are added as fillers to cosmetic formulations inter alia due to their soft focus effect. Based on the spherical structure of the $SiO_2$ and $TiO_2$ particles, an essentially undirected reflection occurs, giving rise to an undesired whitening effect on the skin.

A comparable application is described for the pearlescent pigments disclosed in WO 2011/045030 A1. These pearlescent pigments comprise a synthetic and mostly transparent plate-like substrate which is surrounded by an optically effective coating, with the substrate having an extraordinarily small diameter and a small thickness, wherein the average substrate thickness falls within the range of from 40 to 110 nm. Based on the small particle size which is preferably in the range of from 3.0 to 5.0 µm, an undesired luster effect can be avoided. Due to the small aspect ratio, i.e. the ratio of the substrate diameter to the substrate thickness, the pearlescent effect is, however, little pronounced.

Besides, there are pearlescent pigments which are based on plate-like metal substrates. The size of the substrates is from 5 to 100 µm, and the thickness thereof is from 0.1 to 5 µm. Due to their metallic core, these pigments need to be phlegmatized, for example with the help of certain solvents, in order to decrease their sensitivity in respect of an explosive reaction.

Furthermore, WO 2005/049739 A2 describes effect pigments comprising an aluminum core or an aluminum alloy core, and US 2015/098972 A1 describes coated, wet-chemically oxidized aluminum effect pigments.

However, the pearlescent pigments known in the art show substantial lacks in several aspects. Principally, due to efficiency reasons, it is desirable to provide pearlescent pigments having a high coverage property as well as a high chroma (colorfulness) in order to comply with the demand of even thinner varnishes as required in the automobile industry, for example. In this respect, one of the disadvantages of well-known pearlescent pigments lies in the high costs associated with their respective manufacturing process.

Therefore, the technical problem underlying the present invention is to provide a process of manufacturing pearlescent pigments, which is environmentally compatible, flexible and economical, and to provide pearlescent pigments having both a high coverage property and a high mechanical stability as well as having an excellent chroma at the same time.

This problem is solved by providing the embodiments characterized in the claims.

In particular, according to the present invention, there is provided a process of manufacturing pearlescent pigments, comprising the steps of:

providing substrates of monolithically structured aluminum platelets having an average thickness of from 1 to 150 nm, and having an aspect ratio expressed by the ratio of the average size to the average thickness of at least 80;

coating the above aluminum platelets with a coating layer A of silicon dioxide;

coating the such coated aluminum platelets with a coating layer B of a metal oxide as an interference layer, with the metal oxide being other than silicon dioxide and having a refractive index of at least 1.8;

wet-oxidizing under basic conditions the above aluminum platelets, either before or after coating with the coating layers A and B, whereby the aluminum platelets are partially or entirely converted into aluminum oxide or aluminum hydroxide; and subsequently isolating the partially or entirely wet-oxidized aluminum platelets coated with the coating layers A and B.

The process of manufacturing pearlescent pigments according to the present invention allows to manufacture pearlescent pigments in an environmentally compatible, flexible and economical manner. The pearlescent pigments obtainable by the process according to the present invention have both a high coverage property and a high mechanical stability, and at the same time, have an excellent chroma. In particular, based on the process of manufacturing pearlescent pigments according to the present invention, it is possible to simply and reproducibly manufacture pearlescent pigments in large quantities with high optical quality.

The pearlescent pigments obtainable by the process according to the present invention comprise monolithically structured, partially or entirely wet-oxidized aluminum platelets having an average thickness of from 1 to 150 nm, and having an aspect ratio expressed by the ratio of the average size to the average thickness of at least 80. The pearlescent pigments further comprise a coating layer A of silicon dioxide and a coating layer B of a metal oxide as an interference layer, with the metal oxide being other than silicon dioxide and having a refractive index of at least 1.8, wherein the coating layer A and the coating layer B coat the wet-oxidized aluminum platelets of the pearlescent pigments in this order.

Herein, the term "aluminum platelet" when used without any further specification typically means the unoxidized aluminum platelet, whereas the term "wet-oxidized aluminum platelet" is to be construed as the aluminum platelet having been exposed to the wet-oxidation step, i.e. wherein the aluminum platelet has been converted into aluminum oxide or aluminum hydroxide, either partially or entirely. In addition, the term "aluminum platelet" typically means the uncoated aluminum platelet as long as no further specification is provided.

The pearlescent pigments according to the present invention can be manufactured economically. They exhibit a surprisingly high coverage property, and thus provide various advantages when used, for example, as a finishing in the automobile industry or for nail lacquers in cosmetics and foundation cosmetics. Furthermore, the pearlescent pigments according to the present invention are characterized by an excellent chroma compared to conventional pearlescent pigments known in the art.

According to the present invention, the aluminum platelets provided as the substrates for the process of manufacturing pearlescent pigments have an average thickness of at most 150 nm, preferably of at most 80 nm, and particularly preferably of at most 25 nm, for example 20 nm or less. The average thickness of the aluminum platelets is at least 1 nm, preferably at least 2.5 nm, and particularly preferably at least 5 nm, for example 10 nm or more. It is preferred that each aluminum platelet has a uniform thickness as far as possible. However, due to the manufacturing process, fluctuations of the thickness can occur within an aluminum platelet. Preferably, these fluctuations should not exceed ±50% with respect to the average thickness of the respective aluminum platelets, more preferably not exceed ±25%, particularly preferably not exceed ±10%, and in particular preferably not exceed ±5%. For example, the fluctuations are between ±5% and ±25% with a mean fluctuation of ±15%. However, since the thickness of the aluminum platelets contributes to the total thickness of the pearlescent pigments only to a small extent, fluctuations of more than ±50% may still be acceptable. In order to achieve a uniform color effect in the pearlescent pigments, it is more important to ensure a precisely and uniformly adjusted thickness of the coating layers A and B, respectively.

Herein, the average thickness of the aluminum platelets is to be understood as the arithmetic mean calculated from the maximum and minimum thicknesses. The determination of the maximum and minimum thicknesses is accomplished by analyzing transmission electron microscopy (TEM) images of coated or uncoated aluminum platelets.

The above procedure for determining the thickness of the aluminum platelets is also applicable to the thickness of the coating layers A and B, respectively.

Herein, as far as reference is made to the "thickness" of an aluminum platelet or of a coating layer, the average thickness thereof is addressed, unless another definition is provided at the respective part of the description.

According to the present invention, the aluminum platelets are monolithically structured. Herein, the term "monolithically" means that the aluminum platelets consist of only one unit without any fractures, stratifications or inclusions. In this context, it is clear to a person skilled in the art that the monolithic structure of the aluminum platelets may be modified in the course of the wet oxidation step.

Preferably, the aluminum platelets are entirely converted into aluminum oxide or aluminum hydroxide in the wet oxidation step. As a result, the wet-oxidized aluminum platelets are homogeneously structured, i.e. there is no occurrence of a density gradient substantially arising within them. Particularly, in case of an entire conversion of the aluminum platelets into aluminum oxide or aluminum hydroxide, the wet-oxidized aluminum platelets neither exhibit a layer-like structure nor have any particles distributed therein. On the other hand, in case of a partial conversion of the aluminum platelets into aluminum oxide or aluminum hydroxide, the wet-oxidized aluminum platelets exhibit a core-shell structure, wherein the shell consists of aluminum oxide or aluminum hydroxide, and the core consists of aluminum.

Due to their simple structure, the aluminum platelets can be manufactured both economically and efficiently. In contrast to this, a more complex, non-monolithic structure of the aluminum platelets would result in a more elaborate, time-consuming and cost-intensive manufacturing process thereof.

The mass proportion of the wet-oxidized aluminum platelets with respect to the coated, wet-oxidized aluminum platelets, i.e. the wet-oxidized aluminum platelets coated with the coating layers A and B, is not specifically limited according to the present invention. Preferably, said mass proportion is at most 30 weight %, more preferably at most 25 weight %, and particularly preferably at most 20 weight %, for example 15 weight % or less. On the other hand, said mass proportion is preferably at least 1 weight %, more preferably at least 2 weight %, and particularly preferably at least 3 weight %, for example 4 weight % or more. In a preferred embodiment of the present invention, the mass proportion of the wet-oxidized aluminum platelets with respect to the coated, wet-oxidized aluminum platelets is from 5 to 12 weight %.

Due to the rather small thickness and the rather small mass proportion of the wet-oxidized aluminum platelets, respectively, the pearlescent pigments according to the present invention have a particularly high coverage property. Moreover, in view of said rather small thickness and said rather small mass proportion, the process of manufacturing pearlescent pigments according to the present invention allows to save resources.

Apart from the thickness, the size of the aluminum platelets is characterized by the aspect ratio which is expressed by the ratio of the average size to the average thickness of the aluminum platelets. According to the present invention, the aspect ratio is at least 80, preferably at least 200, more preferably at least 500, and particularly preferably at least 750. In this respect, the average size of the aluminum platelets is equivalent to their $d_{50}$ value. Herein, the $d_{50}$ value, unless stated otherwise, is determined using a device of the type "Helos" manufactured by "Sympatec", which is supplied with a wet dispersion apparatus. The sample preparation comprises the step of pre-dispersing the sample to be analyzed for a duration of 3 minutes in isopropanol.

Accordingly, in view of the above, the size of the aluminum platelets is not particularly critical, and therefore, it can be adjusted to be appropriate for the respective application purpose, provided that the aspect ratio is at least 80. For example, the average size $d_{50}$ of the aluminum platelets is from 2 to 200 In accordance with a preferred embodiment, the average size $d_{50}$ of the aluminum platelets is from 5 to 100 μm, wherein the lower limit thereof is more preferably at least 8 μm and particularly preferably at least 10 μm, and wherein the upper limit thereof is more preferably at most 50 μm and particularly preferably at most 30 μm. However, depending upon the application purpose, e.g. when using the pearlescent pigments according to the present invention as an industrial varnish, the average size $d_{50}$ of the aluminum platelets can amount to a value of around 70 μm, for example. If the average size $d_{50}$ of the aluminum platelets is, for example, around 2 μm, it is clear to a skilled person to select a corresponding low upper limit for the average thickness of the aluminum platelets, i.e. an upper limit of around 25 nm in this case.

The pearlescent pigments obtainable by the process according to the present invention, i.e. the wet-oxidized aluminum platelets coated with the coating layers A and B, preferably have an overall thickness of from 50 to 800 nm, more preferably from 100 to 700 nm, and particularly preferably from 130 to 400 nm, for example from 150 to 350 nm. Due to the rather small thickness of the aluminum platelets, the pearlescent pigments according to the present invention have a particularly high coverage property. In particular, the comparatively small overall thickness of the coated aluminum platelets is achieved due to the fact that the thickness of the aluminum platelets is rather small and that the thickness of the coating layer A is adjusted to a small value such as possible. Since the thickness of the coating layer B affects the color impression of the resulting pearlescent pigments, no further flexibility in respect of the overall thickness of the pearlescent pigments remains when a certain color effect is desired.

Up to now, it has been assumed that only substantially non-translucent, i.e. opaque materials, for example metals such as aluminum, are particularly suitable as substrate platelets in pearlescent pigments for achieving a high coverage property. Apart from monolayered mica and graphene, there has hardly been any technical possibility of manufacturing inorganic substrates having small layer thicknesses such as less than 200 nm, for example. Beyond that, it has been also assumed that inter alia because of the danger of cracking, which would lead to a significantly decreased coverage property of the resulting pearlescent pigments, a certain minimum thickness has to be maintained.

However, as surprisingly found out by the inventors, pearlescent pigments can be manufactured on the basis of partially or entirely translucent substrate platelets, e.g. on the basis of wet-oxidized aluminum platelets, having a layer thickness of at most 150 nm, preferably at most 80 nm, and particularly preferably at most 25 nm, with the pearlescent pigments having a coverage property which is higher than that of conventional metallic luster pigments known in the art. Probably, the reason for this lies in the fact that due to the comparatively small overall thickness of the wet-oxidized aluminum platelets coated with the coating layers A and B, a higher surface coverage of the pearlescent pigments is achieved. As the coated, wet-oxidized aluminum platelets are thin, an enlarged surface can be covered with the same amount of pigment. The increased light transmission of thin and partially or entirely translucent, wet-oxidized aluminum platelets is overcompensated by this favorable effect so that a higher coverage property as well as a higher chroma are finally achieved depending on the metal oxide used for the interference layer, when compared to pearlescent pigments based on thick substrate platelets.

The above-defined aluminum platelets are provided as the substrates for the process of manufacturing pearlescent pigments according to the present invention. In the wet oxidation step, the aluminum platelets are partially or entirely converted into aluminum oxide or aluminum hydroxide, either before or after they are coated with the coating layers A and B. The degree of conversion can be monitored by using thermogravimetric analysis (TGA), microscopic techniques including scanning electron microscopy (SEM) and transmission electron microscopy (TEM), energy dispersive X-ray analysis, elemental analysis, density measurements, or combinations thereof. Preferably, the aluminum platelets are entirely converted into aluminum oxide or aluminum hydroxide in the wet oxidation step. In case of a partial conversion, preferably at least 60%, more preferably at least 70%, and particularly preferably at least 80% of the aluminum in the aluminum platelets is converted into aluminum oxide or aluminum hydroxide. Subsequent to the wet oxidation step, an additional oxidation step may be carried out as required, e.g. at a temperature in the range of from 50 to 350° C., such as 120° C.

In order to promote the oxidation of the aluminum platelets in the course of the wet oxidation step, the aluminum platelets can be treated, if necessary, with appropriate means such as doping, for example.

The aluminum platelets used in the manufacturing process according to the present invention can be obtained inter alia by punching of an aluminum foil or by usual grinding and atomization techniques. For example, the aluminum platelets can be obtained by the Hall process which is a wet grinding process. The aluminum platelets can exhibit various shapes. The aluminum platelets which are used according to the present invention comprise, for example, lamellar and lenticular aluminum platelets or so-called vacuum-metallized pigments (VMP). Lamellar aluminum platelets are characterized by an irregularly structured edge. Due to their appearance, they are commonly referred to as "corn-flakes". Lenticular aluminum platelets have an essentially regular round edge. Due to their appearance, they are commonly referred to as "silverdollars" or "dollarflakes". Because of their irregular structure, metallic luster pigments on the basis of lamellar aluminum platelets generate a higher portion of scattered light in comparison with lenticular aluminum platelets. On the other hand, metallic luster pigments on the basis of lenticular aluminum platelets are dominated by the amount of reflected light. Preferably, VMPs are used according to the present invention. VMPs can be obtained by releasing aluminum from metallized foils, and are characterized by a particularly small thickness of the aluminum platelets, which is in the range of from 1 to 40 nm as well as by their particularly smooth surface resulting in an increased reflectivity.

Preferably, the aluminum platelets, either before or after being coated with the coating layers A and B, are entirely converted into aluminum oxide or aluminum hydroxide in the wet oxidation step, i.e. the wet-oxidized aluminum platelets constitute a monolithic and homogeneous material within the pearlescent pigments. In this regard, the present invention differs from usual procedures, wherein the wet oxidation is only capable of oxidizing the outer shell(s) of the substrate. In another embodiment of the present invention, the aluminum platelets are partially converted into aluminum oxide in the wet oxidation step. As a result, an aluminum core is maintained under the aluminum oxide or aluminum hydroxide layer formed by the wet oxidation, but the core can be subject to a further oxidation subsequently, as required.

An entire conversion of the aluminum platelets into aluminum oxide or aluminum hydroxide in the wet oxidation step of the manufacturing process according to the present invention can be achieved due to the rather small thickness of the aluminum platelets. If the thickness of the aluminum platelets is larger than 150 nm, it will be difficult to achieve an entire oxidation of the aluminum platelets in the course of the wet oxidation step. The evaluation as to whether the aluminum platelets have been entirely converted into aluminum oxide or aluminum hydroxide can preferably be accomplished by means of transmission electron microscopy (TEM) in combination with energy dispersive X-ray analysis.

The pearlescent pigments according to the present invention are characterized by an essentially transparent coating layer A as well as by a coating layer B of a high-refractive metal oxide, wherein the latter acts as the interference layer. Principally, suitable materials for the coating layer A and for the coating layer B are substances which can be formed on the aluminum platelets in form of a persisting film, and which exhibit the required optical properties. Herein, the term "essentially transparent" means that the coating layer A transmits at least 70%, preferably at least 80%, and particularly preferably at least 90% of the incident visible light.

Generally, it may be sufficient that the coating layer B is formed only on a part of the surface of the aluminum platelets already coated with the coating layer A for obtaining pearlescent pigments with appropriate optical properties after the wet oxidation step. For example, only the upper and/or lower main surface of the aluminum platelets may be coated, with the side surface(s) left blank. According to the present invention, it is, however, preferred that the entire surface of the aluminum platelets already coated with the coating layer A is coated with the coating layer B, including the side surfaces. The aluminum platelets are thus completely coated by the coating layer B. Such a complete coating leads to an improvement in the optical properties of the pearlescent pigments obtainable by the process according to the present invention. The same considerations also apply to the coating layer A.

According to the present invention, one or more additional layer(s) of a high-refractive metal oxide may coat the coating layer B. In case one or more such additional layer(s) is/are present, the coloristic properties of the pearlescent pigments can be further adjusted. However, for most applications, it is not required that the coating layer B is coated with another layer of a high-refractive metal oxide.

In accordance with a preferred embodiment, the coating layer B as the interference layer has a thickness of at least 1 nm, more preferably at least 10 nm, and particularly preferably at least 20 nm. Preferably, the thickness of the coating layer B is at most 250 nm, more preferably at most 200 nm, and particularly preferably at most 150 nm. In this context, the thickness of the interference layer is equivalent to the single layer thickness of the coating layer B, which is accounted for twice in the pearlescent pigments when coating both the upper and the lower main surface of the aluminum platelets.

The ratio of the thickness of the coating layer B to the thickness of the aluminum platelets is preferably at least 2, for example 4, 8 or 10. Principally, there is no upper limit for said ratio. However, due to practical reasons, said ratio should be at most 1000, wherein a ratio of at most 500 is preferred. The average thickness of the coating layer A and the coating layer B, respectively, as well as the average thickness of the aluminum platelets are based on the arithmetic mean of the maximum and minimum thicknesses thereof, as already mentioned.

According to the present invention, the coating layer A which is present between the aluminum platelets and the coating layer B is low-refractive and composed of silicon dioxide.

Occasionally, both the coating layer A and the coating layer B may contain a certain portion of minor components. Typically, metal hydroxides are to be mentioned as such minor components. For example, the coating layer B when composed of iron oxide may contain a certain portion of iron hydroxide.

Herein, the terms "high-refractive" and "low-refractive" refer to materials having a high refractive index and a low refractive index, respectively. High-refractive materials have a refractive index of at least 1.8, preferably at least 2.0, and particularly preferably at least 2.4. Low-refractive materials have a refractive index of less than 1.8, preferably at most 1.6, and particularly preferably at most 1.5.

According to the present invention, the coating layer B is composed of a high-refractive metal oxide other than silicon dioxide, wherein the coating layer B is composed of one specific metal oxide only. Preferably, high-refractive metal oxides which are suitable for the coating layer B are selectively light-absorbing, i.e. colored metal oxides, for example iron (III) oxide (α- and γ-$Fe_2O_3$, red), cobalt (II) oxide (blue), chrome (III) oxide (green), titanium (III) oxide (blue), nickel (II) oxide (greenish), copper (I/II) oxide (blue), and vanadium (V) oxide (orange), without being limited to those compounds, however. Furthermore, colorless high-refractive metal oxides are also suitable for the coating layer B, for example, titanium dioxide, antimony (III) oxide, zinc (II) oxide, and zirconium dioxide. Preferably, the coating layer B as the interference layer is composed of titanium dioxide, or in case of a colored metal oxide, of iron (III) oxide.

Beyond that, it is preferred that the coating layer B as the interference layer contains corresponding dopants when it is composed of a colorless metal oxide. For example, it is preferred that when the coating layer B is composed of titanium dioxide, dopants selected from the group consisting of tin, aluminum, lithium, zirconium, iron or cerium, in particular the salts thereof, are contained therein, preferably in an amount of from 0.001 to 5 weight %, and particularly preferably in an amount of from 0.01 to 1 weight %. Besides, the interference layer may contain a selectively light-absorbing dye, preferably in an amount of from 0.001 to 5 weight %, and particularly preferably in an amount of from 0.01 to 1 weight %. In this context, organic and inorganic dyes which can be stably incorporated into the coating layer B are suitable.

As required, one or more additional layer(s) of a low-refractive material may be present between the coating layer A and the coating layer B. For example, when the coating layer B is composed of titanium dioxide, a layer of tin dioxide may be placed below the titanium dioxide layer in order to accomplish the rutilisation thereof. Accordingly, in an embodiment of the pearlescent pigments according to the present invention, a thin tin dioxide layer is included between the coating layer A and the coating layer B, which is only a few nanometers thick, e.g. less than 10 nm.

The coating layer A having a low refractive index is composed of silicon dioxide. The thickness of the coating layer A is usually in the range of from 1 to 1000 nm, preferably from 5 to 300 nm, and particularly preferably from 10 to 150 nm. In accordance with a preferred embodiment, the coating layer A has a thickness of from 5 to 100 nm, more preferably from 5 to 40 nm, and particularly preferably from 10 to 40 nm.

As described hereinafter in more detail, the thickness of the coating layer A as well as the thickness of the coating layer B can be variably and precisely adjusted in the process of manufacturing pearlescent pigments according to the present invention.

In the embodiment described above, according to which the coating layer A has a thickness of from 5 to 100 nm, the distance between the surface of the aluminum platelets and the inner surface of the coating layer B is preferably at most 100 nm, more preferably at most 50 nm, and particularly preferably at most 20 nm.

With the thickness of the coating layer A falling within the above range, it can be ensured that the coated, wet-oxidized aluminum platelets of the pearlescent pigments according to the present invention have a high coverage property, corresponding to a comparatively small ΔE value. The ΔE value represents the total color difference which is preferably at most 25, more preferably at most 20, and particularly preferably at most 15 in the pearlescent pigments according to the present invention. The determination of ΔE is accomplished in accordance with DIN 55987, wherein a film of varnish is applied to a board having a black and a white surface, respectively, with the varnish containing the pearlescent pigments according to the present invention with a mass proportion of 3 or 12 weight % (dry weight). The layer thickness of the dried finishing amounts to a value of from 8 to 12 μm. Subsequently, the total color difference ΔE is determined between the finishing on the black and the white surface.

Furthermore, in case of a transparent coating layer B, e.g. when composed of titanium dioxide, the small overall thickness of the finally obtained pearlescent pigments leads to an excellent chroma in the observation angle of 15°.

In accordance with a further preferred embodiment, the thickness of the coating layer A is equal to or more than 10 nm. The thickness of the coating layer A can be variably and precisely adjusted in accordance with the dimension of the aluminum platelets, and in accordance with the metal oxide, i.e. the refractive index thereof, as well as with the desired thickness of the coating layer B. Within a range of from 10 to 200 nm for the thickness of the coating layer A, special color effects can be achieved in combination with the coating layer B as the interference layer.

The process of manufacturing pearlescent pigments according to the present invention comprises the step of coating the aluminum platelets, either before or after the wet oxidation step, with a coating layer A composed of silicon dioxide. For example, soluble glass may be used as a suitable precursor to form the coating layer A composed of silicon dioxide.

Preferably, the coating layer A is formed by a hydrolytic decomposition of a suitable precursor on the aluminum platelets. Appropriately, to form the coating layer A on the aluminum platelets, an organic silicon compound may be hydrolyzed in the presence of the aluminum platelets. The organic silicon compound has organic moieties which are bound via oxygen atoms to the silicon atom(s). The organic silicon compound may be applied in solute form.

For this purpose, a plurality of organic solvents is suitable, with isopropanol being preferable. Preferred embodiments of the organic silicon compound comprise silicon-based alkoxides, such as tetraethoxysilane (tetraethyl orthosilicate, TEOS).

The hydrolysis of the organic silicon compound is preferably carried out in the presence of a base or an acid as a catalyst. For this purpose, aqueous ammonia solutions are particularly suitable besides alkaline solutions, such as sodium hydroxide. Suitable acid catalysts are, for example, phosphoric acid as well as organic acids, such as acetic acid or oxalic acid. The hydrolysis of the organic silicon compound may thus be regarded as a sol gel process.

In this context, water has to be present at least in the quantity which is stoichiometrically required for the hydrolysis. Preferably, the amount of water is 2 to 100 times the quantity required, in particular 5 to 20 times the quantity required. Based on the amount of water applied in the sol gel process, 3 to 40 volume % of an aqueous ammonia solution with a concentration of 25 weight % are preferably added, with 5 to 30 volume % thereof being particularly preferable.

To control the temperature during the hydrolysis, it has been shown advantageous to heat the reaction mixture gradually on reflux temperature within 10 to 48 hours. When using isopropanol as the solvent, the mixture is first stirred, for example, preferably for 4 to 20 hours at 40° C., then for 4 to 20 hours at 60° C., and in the end for 2 to 8 hours at 80° C.

Due to technical reasons, the step of coating the aluminum platelets with the coating layer A is preferably as follows:

The aluminum platelets, an organic solvent, water and a catalyst (an acid or preferably a base, e.g. an aqueous ammonia solution) are provided. Subsequently, the organic silicon compound to be hydrolyzed is added as a pure substance or dissolved in an organic solvent with a concentration of, for example, 30 to 70 volume %, and preferably 40 to 60 volume %. If the addition of the organic silicon compound is carried out within one step, the suspension is then subsequently heated under stirring, as described above. As an alternative, the organic silicon compound can be continuously added at increased temperature, wherein water and the aqueous ammonia solution can be provided, or likewise, added continuously. As soon as the coating procedure has been accomplished, the reaction mixture is cooled down to ambient temperature.

In order to avoid the formation of agglomerates during the formation of the coating layer A, the suspension can be exposed to a mechanical treatment, such as pumping, vigorous stirring or ultrasound.

As required, the above-described coating procedure can be repeated one or several more time(s). If the mother liquor appears to be cloudy, it is advisable to exchange the latter before carrying out another coating run.

The isolation of the aluminum platelets coated with the coating layer A can be accomplished in a simple way by filtration, washing off with an organic solvent, preferably with the alcohol used as the solvent, followed by drying, usually for 2 to 24 hours at 20 to 200° C. According to the present invention, the aluminum platelets coated with the coating layer A need not be isolated, and can be readily used in situ to form the coating layer B thereon.

As described above, the process of manufacturing pearlescent pigments according to the present invention comprises the step of coating the such coated aluminum platelets with the coating layer B. Preferably, the coating layer B is formed by precipitation of a dissolved metal salt to form a metal oxide as the coating layer B on the aluminum platelets already coated with the coating layer A.

For example, an $\alpha$-$Fe_2O_3$ coating as the coating layer B can be formed by precipitation of dissolved iron (III) salts, like iron (III) chloride and iron (III) sulfate, respectively. Subsequently, the initially formed iron (III) hydroxide layer is transformed into the iron (III) oxide layer by annealing. For example, annealing is carried out in an air atmosphere at a temperature of around 350° C. As an alternative, an argon atmosphere or a nitrogen atmosphere may be employed. In a similar way, a coating layer B composed of titanium dioxide can be formed by precipitation of dissolved titanium salts, like titanium (IV) chloride, followed by annealing.

According to the present invention, the conversion of the aluminum platelets into aluminum oxide or aluminum hydroxide is accomplished by performing a wet oxidation step, either before or after coating the aluminum platelets with the coating layers A and B. Said wet oxidation step is preferably carried out in a temperature range of from 25 to 100° C. Depending on the duration of the wet oxidation step, the aluminum platelets are either partially or entirely oxidized, i.e. converted into aluminum oxide or aluminum hydroxide, yielding pearlescent pigments having an unusually high coverage property as well as an excellent chroma. Accordingly, based on the wet oxidation step in combination with the other process steps as described above, it is possible to provide extremely thin pearlescent pigments having improved optical properties.

The wet oxidation step is preferably carried out for a duration of 10 minutes to 48 hours in the above-mentioned temperature range. The wet oxidation step typically takes place in a basic solution at a pH in the range of from 8 to 12. For example, aqueous solutions of sodium hydroxide, potassium hydroxide or ammonia can be used as the basic medium.

The thickness of the aluminum platelets is maintained in the course of the wet oxidation step, irrespective of whether the aluminum platelets are partially or entirely converted into aluminum oxide or aluminum hydroxide. The same applies to the overall thickness of the coated, wet-oxidized aluminum platelets. Accordingly, the respective thickness values as provided above are also valid after the wet oxidation step has been accomplished.

Surprisingly, the pearlescent pigments according to the present invention have an excellent chroma. Probably, this is due to the fact that the proportion of the coating layer B as the interference layer with regard to the total weight of the pearlescent pigments is very much larger compared to conventional pigments which have substantially thicker substrates. Beyond that, according to the present invention, it is possible to obtain pearlescent pigments having the characteristics as described above, wherein the thickness of the aluminum platelets is precisely adjustable, and in addition, wherein the coating layers A and B can be formed with a precise thickness on the aluminum platelets, respectively.

To evaluate the coloristic properties of the pearlescent pigments obtainable by the process according to the present invention, angle-dependent brightness measurements can be conducted and analyzed, as described below in more detail. Here, under a constant incident angle of 45°, the coloristic data is determined as a function of the observation angle. To determine the coloristic properties of the pearlescent pigments, a varnish with a pigment concentration of 3 or 12 weight % based on the bonding agent is provided and applied on a board having a black and a white surface with a layer thickness of from 8 to 12 µm by means of a blade. The respective coloristic properties are determined with a device of the type "BYK-mac" manufactured by "BYK Additive and Instrumente". The observation angle is 15°.

In a typical application, a varnish with a pigment concentration of 10 weight % is applied on a black and white board using 38 µm bar.

As described above, the overall thickness of the pearlescent pigments according to the present invention can be precisely adjusted. In particular, the coating layers A and B can be formed with a precise thickness on the aluminum platelets, respectively, resulting in genuine optical multi-layer systems.

Since neither aluminum oxide/aluminum hydroxide nor silicon dioxide have an intrinsic color, and since the occurrence of impurities is minimized by the manufacturing process according to the present invention, it is possible to obtain pearlescent pigments with a purer interference effect. In particular, this is an advantage in comparison with mica-based pearlescent pigments known in the art.

The manufacturing process according to the present invention allows to simply and reproducibly manufacture pearlescent pigments having unique coloristic properties in large quantities, wherein the coating layers A and B coating the aluminum platelets are of very high quality, i.e. they are homogeneous and film-like.

In another aspect, the present invention relates to the use of the above-described pearlescent pigments for coloring of varnishes, printing inks, inks, plastics, glasses, ceramic products and preparations for decorative cosmetics as well as security applications.

The pearlescent pigments according to the present invention are particularly suitable for many purposes, such as the coloring of plastics, glasses, ceramic products, preparations for decorative cosmetics, and in particular, the coloring of inks, printing inks as well as safety printing inks, and in particular, the coloring of varnishes, for example, for use in the automobile industry.

For these application purposes, it is preferred to use the pearlescent pigments according to the present invention as a mixture with transparent and covering white, multicolored and black pigments as well as with conventional luster pigments on the basis of mica or metal, which are coated with metal oxide, and plate-like iron oxides.

The pearlescent pigments according to the present invention can be manufactured economically. They have an unusually high coverage property as well as an excellent chroma, and thus, they provide various advantages when used, for example, as a finishing in the automobile and vehicle industry.

The figures show:

FIG. 2 illustrates that aluminum atoms have migrated into the coating layer B as a result of the wet oxidation step.

Figure 1:
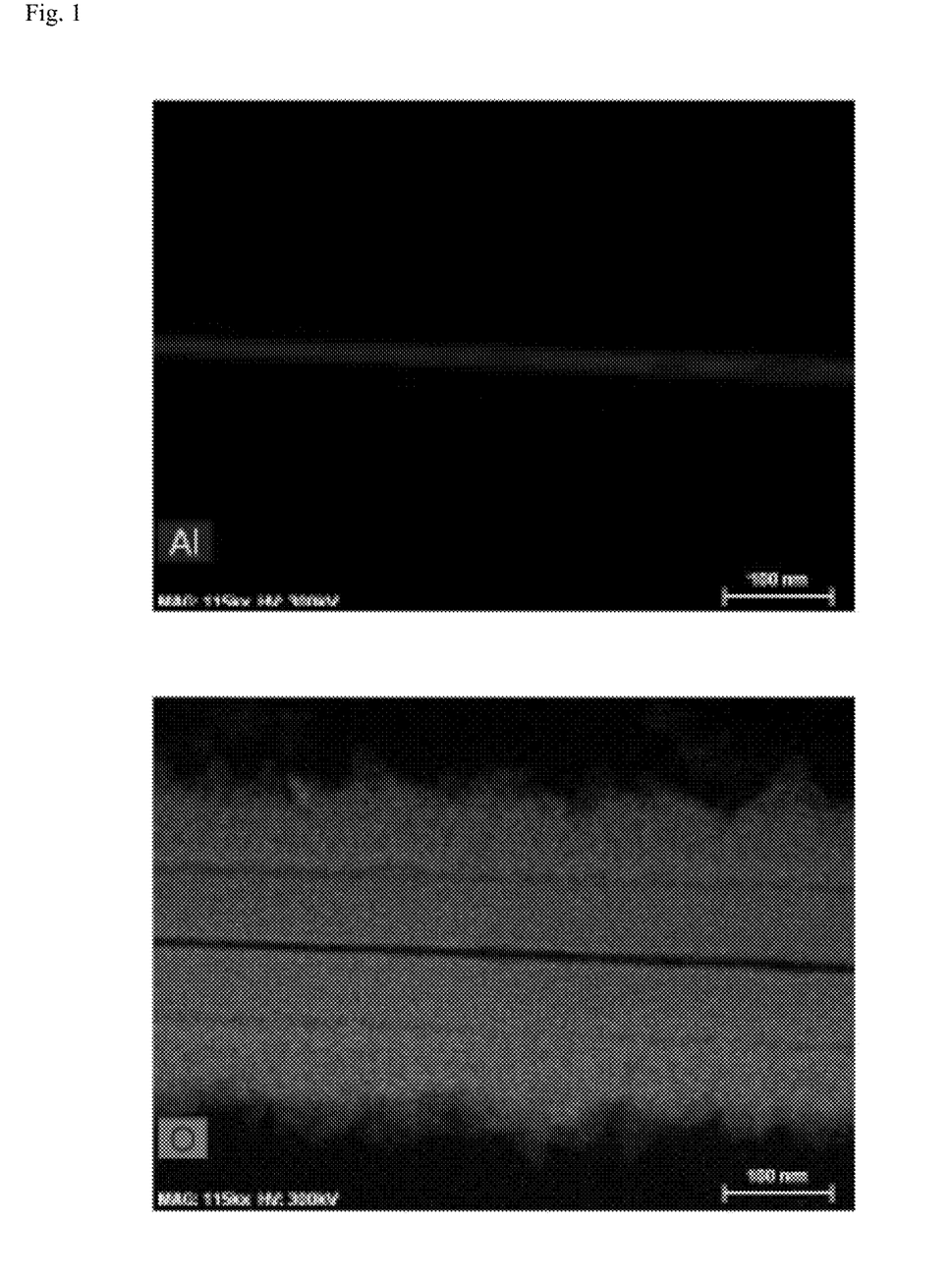
FIG. 1 shows a transmission electron microscopy (TEM) image in combination with energy dispersive X-ray analysis of an aluminum platelet coated with the coating layers A and B before carrying out the wet oxidation step. As can be taken from FIG. 1, there is no oxygen present in the aluminum platelet.
Figure 2:
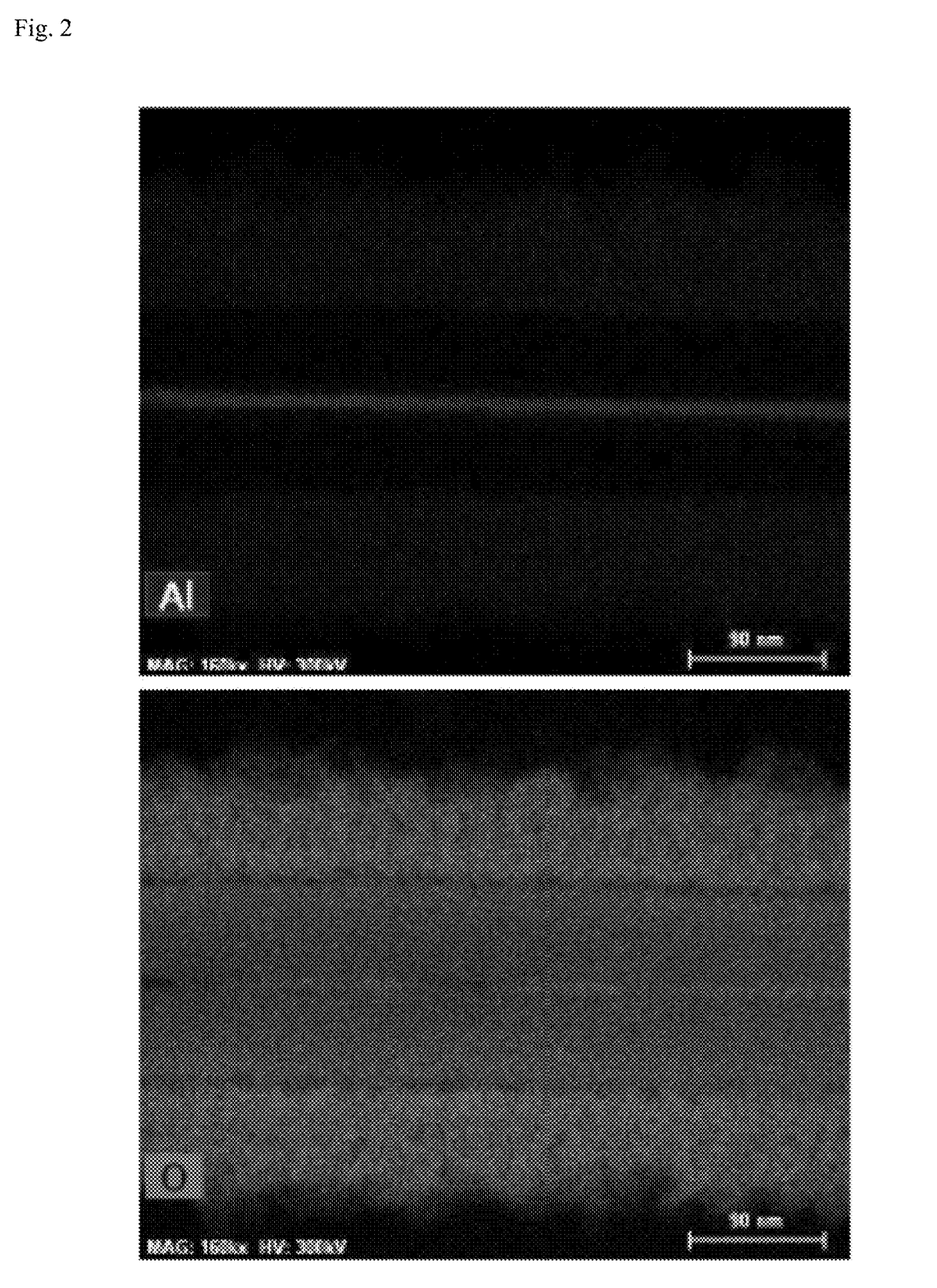
FIG. 2 shows a transmission electron microscopy (TEM) image in combination with energy dispersive X-ray analysis of an aluminum platelet coated with the coating layers A and B after carrying out the wet oxidation step. As can be taken from FIG. 2, oxygen is present throughout the aluminum platelet, i.e. the aluminum platelet has been entirely converted into aluminum oxide. In addition.

The following Examples are intended to further illustrate the present invention without being limited thereto.

EXAMPLE 1

Thin aluminum oxide platelets with silicon dioxide coating (50 nm) and iron (III) oxide coating (90 nm)

First, 10 g of aluminum platelets (thickness between 10 nm and 20 nm, $d_{50}$=20 μm) were coated by means of a sol gel process using tetraethyl orthosilicate (TEOS) to yield 60 g $SiO_2$. In a round bottom flask equipped with a reflux condenser and a stirrer, these aluminum platelets were exposed to 500 mL of deionized water and warmed up to 75° C. under stirring. The pH was adjusted to a value of 3.2 by adding a NaOH solution (10 weight %). 700 g of a $FeCl_3$ solution (40 weight %) were added to the reaction mixture. The pH was kept essentially constant at 3.2 by simultaneously adding a NaOH solution (10 weight %). After the $FeCl_3$ solution had been completely added, the mixture was stirred for further 15 minutes in order to ensure a complete precipitation. Then, the pH was increased to a value of 7.0 by adding a NaOH solution (10 weight %) for 30 minutes in a dropwise manner. After 30 minutes of further stirring, the coated pigments were separated from the supernatant reaction solution by filtration and washed until the pigments were free of salt. Finally, the coated aluminum platelets were annealed in an air atmosphere at 350° C. for 5 hours.

The such obtained pigments (Al: 5%, $SiO_2$: 30%, $Fe_2O_3$: 65%) were then exposed to a wet oxidation step. 50 g of said pigments which had a golden color hue were dispersed in 500 g of water and heated up to 95° C., and kept for 1 hour at pH 10.5 using an aqueous ammonia solution (25 weight %). The slurry was then filtrated, washed by water, dried at 120° C., and sieved through a sieve with 32 μm mesh size.

The pearlescent pigments obtained after the wet oxidation step appeared orange in color, and were evaluated using a "BYK-mac" device in terms of their coloristic properties.

When compared to a commercially available pigment with a comparable color, the pearlescent pigment of Example 1 exhibited a better coverage property in terms of its total color difference ΔE45°, and a higher chroma C*15°, which can be taken from Table A, below.

TABLE A

| coloristic properties of the pearlescent pigment of Example 1 and a commercially available pigment with a comparable color | | | | | |
|---|---|---|---|---|---|
| Sample | L*15° | a*15° | b*15° | C*15° | ΔE45° |
| Example 1 | 91.7 | 50.3 | 72.9 | 88.6 | 17.7 |
| Iriodin 9502 | 109.5 | 42.8 | 39.6 | 58.3 | 24.8 |

EXAMPLE 2

Thicker aluminum oxide platelets with silicon dioxide coating (50 nm) and iron (III) oxide coating (90 nm)

In contrast to Example 1 as described above, aluminum platelets having a thickness of 80 nm were used in Example 2. Apart from this, the coating of the aluminum platelets with the coating layer A ($SiO_2$) and with the coating layer B ($Fe_2O_3$) was performed in the same way.

The such obtained pigments (Al: 22.5%, $SiO_2$: 5.5%, $Fe_2O_3$: 72%) were then exposed to a wet oxidation step. 50 g of said pigments which had a golden color hue were dispersed in 500 g of water and heated up to 30° C., and kept for 1 hour at pH 12 using a KOH solution (30 weight %). The slurry was then filtrated, washed by water, dried at 120° C., and sieved through a sieve with 32 μm mesh size.

The pearlescent pigments obtained after the wet oxidation step appeared orange in color, and were evaluated using a "BYK-mac" device in terms of their coloristic properties.

When compared to a commercially available pigment with a comparable color, the pearlescent pigment of Example 2 exhibited a better coverage property in terms of its total color difference ΔE45°, and a higher chroma C*15°, which can be taken from Table B, below.

TABLE B

| coloristic properties of the pearlescent pigment of Example 2 and a commercially available pigment with a comparable color | | | | | |
|---|---|---|---|---|---|
| Sample | L*15° | a*15° | b*15° | C*15° | ΔE45° |
| Example 2 | 92.6 | 37.4 | 51.6 | 63.7 | 8.9 |
| Iriodin 9502 | 109.5 | 42.8 | 39.6 | 58.3 | 24.8 |

EXAMPLE 3

76.34 g of aluminum paste (thickness 100 nm, $d_{50}$=26 μm, 65.5 weight % solids, stearin acid 0.8 weight % in solids, 34.5 weight % white spirit, equivalent to 50 g aluminum, dollarflakes) were dispersed in 500 g of isopropanol in a 1 L round flask, and stirred for 30 minutes with heating up to 70° C. 66.67 g of an aqueous ammonia solution (25 weight %) were added and kept for 8 hours at 70° C. with mixing. The such prepared sample was filtered, washed with isopropanol, dried at 120° C., and sieved through a sieve with 32 μm mesh size. In the wet-oxidized sample, metal aluminum was contained in an amount of 36.20% as determined by a TGA analyzer.

Then, a silicon dioxide layer was applied on 68.4 g of the above wet-oxidized sample by means of a sol gel process using tetraethyl orthosilicate (TEOS) to yield 38 g $SiO_2$.

Finally, an iron (III) oxide layer was applied on the wet-oxidized sample coated with the silicon dioxide layer as follows: 600 mL of the above slurry (containing 20 g aluminum in total, calculated from aluminum and aluminum oxide) were heated up to 75° C., and 10 g of iron (III) oxide were coated on the sample under stirring at pH 3.2 using a $FeCl_3$ solution (20 weight %) and an aqueous ammonia solution (18 weight %). The such prepared sample was filtrated, washed by water, dried at 120° C., and calcinated at 350° C.

The pearlescent pigments obtained after the final coating step appeared bronze in color, and were evaluated using a "BYK-mac" device in terms of their coloristic properties.

When compared to a commercially available pigment with a comparable color, the pearlescent pigment of Example 3 exhibited a better coverage property in terms of its total color difference ΔE45°, and a higher chroma C*15°, which can be taken from Table C, below.

TABLE C coloristic properties of the pearlescent pigment of Example 3 and a commercially available pigment with a comparable color

| Sample | L*15° | a*15° | b*15° | C*15° | ΔE45° |
|---|---|---|---|---|---|
| Example 3 | 132.3 | 24.3 | 74.1 | 78.0 | 0.3 |
| Iriodin 500 | 120.9 | 19.8 | 43.4 | 47.7 | 19.4 |

EXAMPLE 4

69.16 g of aluminum paste (thickness 100 nm, $d_{50}$=22 μm, 72.3 weight % solids, stearin acid 0.8 weight % in solids, 27.7 weight % white spirit, equivalent to 50 g aluminum, dollarflakes) were dispersed in 500 g of isopropanol in a 1 L round flask, and stirred for 30 minutes with heating up to 65° C. 80 g of an aqueous ammonia solution (25 weight %) were added and kept for 8 hours at 65° C. with mixing. The such prepared sample was filtrated, washed with isopropanol, dried at 120° C., and sieved through a sieve with 32 μm mesh size. In the wet-oxidized sample, metal aluminum was contained in an amount of 30% as determined by a TGA analyzer.

Then, a silicon dioxide layer was applied on 33 g of the above wet-oxidized sample by means of a sol gel process using tetraethyl orthosilicate (TEOS) to yield 30 g $SiO_2$.

Finally, a titanium dioxide layer was applied on the wet-oxidized sample coated with the silicon dioxide layer as follows: 600 mL of the above slurry (containing 20 g aluminum in total, calculated from aluminum and aluminum oxide) were heated up to 75° C., and 15 g of titanium dioxide were coated on the sample under stirring at pH 3.4 using a $TiOCl_2$ solution (25.33 weight %) and an aqueous ammonia solution (13 weight %). In the coating process, 10 mL of the slurry were sampled to evaluate the colors. Each sample was filtrated, washed by water, dried at 120° C., and calcinated at 350° C.

The pearlescent pigments obtained after the final coating step were evaluated using a "BYK-mac" device in terms of their coloristic properties.

When compared to a commercially available Ti pigment, the pearlescent pigment of Example 4 exhibited a better coverage property in terms of its total color difference ΔE45°, and a higher chroma C*15°, which can be taken from Table D, below.

TABLE D coloristic properties of the pearlescent pigment of Example 4 and a commercially available Ti pigment

| Sample | L*15° | a*15° | b*15° | C*15° | ΔE45° |
|---|---|---|---|---|---|
| Example 4 | 132.3 | 24.3 | 74.1 | 78.0 | 0.3 |
| Iriodin 7235 | 97.0 | −47.6 | 20.8 | 52.0 | 53.9 |

Despite the partially or entirely transparent nature of the wet-oxidized aluminum platelets, the total color difference ΔE45° was comparatively small. Accordingly, the pearlescent pigments obtained in Examples 1 to 4 had an excellent coverage property. In addition, the pearlescent pigments had an excellent chroma C*15°.

What is claimed is:

1. A process of manufacturing pearlescent pigments, comprising the steps of:
   providing substrates of monolithically structured aluminum platelets having an average thickness of from 1 to 150 nm, and having an aspect ratio expressed by the ratio of the average size to the average thickness of at least 80;
   coating the above aluminum platelets with a coating layer A of silicon dioxide;
   coating the such coated aluminum platelets with a coating layer B of a metal oxide as an interference layer, with the metal oxide being other than silicon dioxide and having a refractive index of at least 1.8;
   wet-oxidizing under basic conditions the above aluminum platelets, after coating with the coating layers A and B, whereby the aluminum platelets are partially or entirely converted into aluminum oxide or aluminum hydroxide; and
   subsequently isolating the partially or entirely wet-oxidized aluminum platelets coated with the coating layers A and B.

2. The process of manufacturing pearlescent pigments according to claim 1, wherein the step of coating with the coating layer A comprises a hydrolytic decomposition of an organic silicon compound.

3. The process of manufacturing pearlescent pigments according to claim 1, wherein the step of coating with the coating layer B comprises a precipitation of a dissolved metal salt, followed by annealing.

4. The process of manufacturing pearlescent pigments according to claim 1, wherein the monolithically structured aluminum platelets are entirely converted into aluminum oxide or aluminum hydroxide in the wet oxidation step.

5. The process of manufacturing pearlescent pigments according to claim 1, wherein the coating layer B is coated with one or more layer(s) of a metal oxide having a refractive index of at least 1.8.

6. The process of manufacturing pearlescent pigments according to claim 1, wherein the monolithically structured aluminum platelets have an average thickness of from 2.5 to 80 nm.

7. The process of manufacturing pearlescent pigments according to claim 1, wherein the monolithically structured aluminum platelets have an average size of from 5 to 100 μm.

8. The process of manufacturing pearlescent pigments according to claim 1, wherein the wet oxidation step is carried out in a temperature range of from 25 to 100° C. for 10 minutes to 48 hours.

9. The process of manufacturing pearlescent pigments according to claim 1, wherein the wet oxidation step is carried out at a pH in the range of from 8 to 12, using a basic solution selected from the group consisting of sodium hydroxide, potassium hydroxide, and ammonia.

10. Pearlescent pigments, obtainable by the process of manufacturing pearlescent pigments according to claim 1, comprising:
    monolithically structured, partially or entirely wet-oxidized aluminum platelets having an average thickness of from 1 to 150 nm, and having an aspect ratio expressed by the ratio of the average size to the average thickness of at least 80;
    a coating layer A of silicon dioxide; and
    a coating layer B of a metal oxide as an interference layer, with the metal oxide being other than silicon dioxide and having a refractive index of at least 1.8, wherein the coating layer A and the coating layer B coat the wet-oxidized aluminum platelets in this order,
    wherein the coating layer B is coated with one or more layer(s) of a metal oxide having a refractive index of at least 1.8.

11. The pearlescent pigments according to claim 10, wherein the monolithically structured, wet-oxidized aluminum platelets are entirely oxidized.

12. The pearlescent pigments according to claim 10, wherein the monolithically structured, wet-oxidized aluminum platelets have an average thickness of from 2.5 to 80 nm.

13. The pearlescent pigments according to claim 10, wherein the monolithically structured, wet-oxidized aluminum platelets have an average size of from 5 to 100 μm.

14. A composition comprising the pearlescent pigments according to claim 10.

15. The composition of claim 14, wherein the composition is chosen from a varnish, an ink, a printing ink, a plastic, a glass, a ceramic, or a cosmetic composition.

* * * * *